(12) United States Patent
Marlow et al.

(10) Patent No.: US 11,228,542 B2
(45) Date of Patent: Jan. 18, 2022

(54) SYSTEMS AND METHODS FOR COMMUNICATION CHANNEL RECOMMENDATIONS USING MACHINE LEARNING

(71) Applicant: FUJIFILM Business Innovation Corp., Tokyo (JP)

(72) Inventors: Jennifer Marlow, Palo Alto, CA (US); Scott Carter, Menlo Park, CA (US); Laurent Denoue, Vento (IT)

(73) Assignee: FUJIFILM Business Innovation Corp., Tokyo (JP)

( * ) Notice: Subject to any disclaimer, the term of this patent is extended or adjusted under 35 U.S.C. 154(b) by 46 days.

(21) Appl. No.: 15/954,337

(22) Filed: Apr. 16, 2018

(65) Prior Publication Data

US 2019/0319900 A1    Oct. 17, 2019

(51) Int. Cl.
*H04L 12/58* (2006.01)
*G06N 20/00* (2019.01)
*G06F 40/30* (2020.01)

(52) U.S. Cl.
CPC .............. *H04L 51/04* (2013.01); *G06F 40/30* (2020.01); *G06N 20/00* (2019.01)

(58) Field of Classification Search
CPC ... G06N 20/00; G06F 17/2785; G06F 40/284; G06F 40/30; H04L 51/32; H04L 51/04; H04L 43/04; H04L 43/08; G06Q 50/01
See application file for complete search history.

(56) References Cited

U.S. PATENT DOCUMENTS

| | | | |
|---|---|---|---|
| 6,775,689 B1 | 8/2004 | Raghunandan | |
| 9,319,367 B2* | 4/2016 | Zeng | G06N 20/00 |
| 9,762,733 B1* | 9/2017 | Ramanujaiaha | H04M 3/42068 |
| 10,594,757 B1* | 3/2020 | Shevchenko | H04L 65/605 |
| 2012/0151383 A1* | 6/2012 | Kazan | G06F 3/048 |
| | | | 715/753 |
| 2015/0032813 A1* | 1/2015 | Doshi | H04L 65/403 |
| | | | 709/204 |
| 2016/0259778 A1* | 9/2016 | Cookson | G06Q 10/107 |

(Continued)

OTHER PUBLICATIONS

Billsus, D., et al., Improving Proactive Information Systems, In Proceedings of the 10th International Conference on Intelligent User Interfaces (IUI'05), Jan. 9-12, 2005, San Diego, CA, 8pp. 159-166.

(Continued)

*Primary Examiner* — Kamal B Divecha
*Assistant Examiner* — Alex H. Tran
(74) *Attorney, Agent, or Firm* — Procopio, Cory, Hargreaves & Savitch, LLP

(57) ABSTRACT

Example implementations are directed to a method of controlling contributions to a communication stream. An example implementation includes detecting a request from a user to add a data item to a communication stream of a channel, analyzing the data item in view of the communication stream to determine a relevancy score for the data item; and providing a control interface for the request based on the relevancy score of the data item. For example, the control interface can include an audience report, a notification, a previous post link, an alternative channel recommendation, a private message invitation, or a proceed to post command.

11 Claims, 10 Drawing Sheets

(56) References Cited

U.S. PATENT DOCUMENTS

| | | | |
|---|---|---|---|
| 2016/0380956 A1* | 12/2016 | Abou Mahmoud | H04L 51/16 |
| | | | 709/206 |
| 2017/0236081 A1* | 8/2017 | Grady Smith | G06Q 10/067 |
| | | | 705/7.36 |
| 2017/0250931 A1* | 8/2017 | Ioannou | H04L 67/2833 |
| 2017/0366491 A1* | 12/2017 | DeLuca | H04L 51/34 |
| 2018/0189693 A1* | 7/2018 | Newhouse | G06Q 10/0631 |
| 2019/0089762 A1* | 3/2019 | Singh | H04L 65/403 |
| 2019/0121866 A1* | 4/2019 | Garg | H04L 51/32 |
| 2019/0279164 A1* | 9/2019 | Byron | G06F 16/2457 |

OTHER PUBLICATIONS

Rizzo, G., et al. What Fresh Media Are You Looking For? Retrieving Media Items from Multiple Social Networks, In Proceedings of the 2012 International Workshop on Socially-Aware Multimedia (SAM'12), Oct. 29, 2012, Nara, Japan, pp. 15-20.

Carter, S., et al., Building Connections Among Loosely Coupled Groups: Hebb's Rule at Work, Computer Supported Cooperative Work (CSCW), Aug. 2004, 13(3-4), pp. 305-327.

* cited by examiner

700

Did you know?

This link was recently shared by francine in #enterprisecomm

710

Did you know?

This link was recently shared in another channel on Slack and has been seen by 3 people (lou, frances, and philippe)

Do you want to share with these people again?

720

Did you know?
laurent shared highlightswireframes_v1.pptx on Nov 17, 2017
The title slide changed from "Title TBD" to "FormYak"

SYSTEMS AND METHODS FOR COMMUNICATION CHANNEL RECOMMENDATIONS USING MACHINE LEARNING

BACKGROUND

Field

The present disclosure is generally directed to machine-learning, and more specifically, to systems and methods for channel recommendations based on data item analysis using machine-learning.

Related Art

Workplace communications frequently occurs via group emails or chat-based communication platforms. In related art implementations, chat-based communication platforms allow users to share information and send content through posts that are published to central stream of posts. Conventionally, different chat channels or threads are implemented to efficiently organize topics, control access to the conversations, and facilitate private sub-conversations. However, the effectiveness of chat-based communication channels suffers when users re-post previously shared information or miss-post information unrelated to the topic of the channel. Receiving duplicate and irrelevant posts can cause the user to disengage from or ignore a chat channel.

As a user participates in more channels for different group and subgroups, the volume of shared content from the multiple chat channels typically results in information overload. Further, users of a chat channel can change rapidly and different chat channels can have overlapping users that contributes to miss-communication and duplicate sharing. Accordingly, users have difficulty locating appropriate communication channels with the intended audience to share new and useful information.

SUMMARY

Example implementations described herein provide systems and methods including channel recommendations for chat-based communications. An example implementation includes a system for detecting a request from a user to send a data item to a group of recipients via a digital communication channel, identifying one or more alternative digital communication channels associated with two more users of the group, analyzing the communication history of the user and the group of recipients to detect similar communications associated to the data item; and providing a set of controls for the similar communications.

An example implementation includes detecting a request from a user to add a data item to a communication stream of a channel, analyzing the data item in view of the communication stream to determine a relevancy score for the data item; and providing a control interface for the request based on the relevancy score of the data item. For example, the control interface can include an audience report, a notification, a previous post link, an alternative channel recommendation, a private message invitation, or a proceed to post command.

A non-transitory computer readable medium, comprising instructions that when executed by a processor, the instructions apply the method of detecting a request from a user to send a data item to a group of recipients via a digital communication channel, identifying one or more alternative digital communication channels associated with two more users of the group, analyzing the communication history of the user and the group of recipients to detect similar communications associated to the data item; and providing a set of controls for the similar communications.

Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
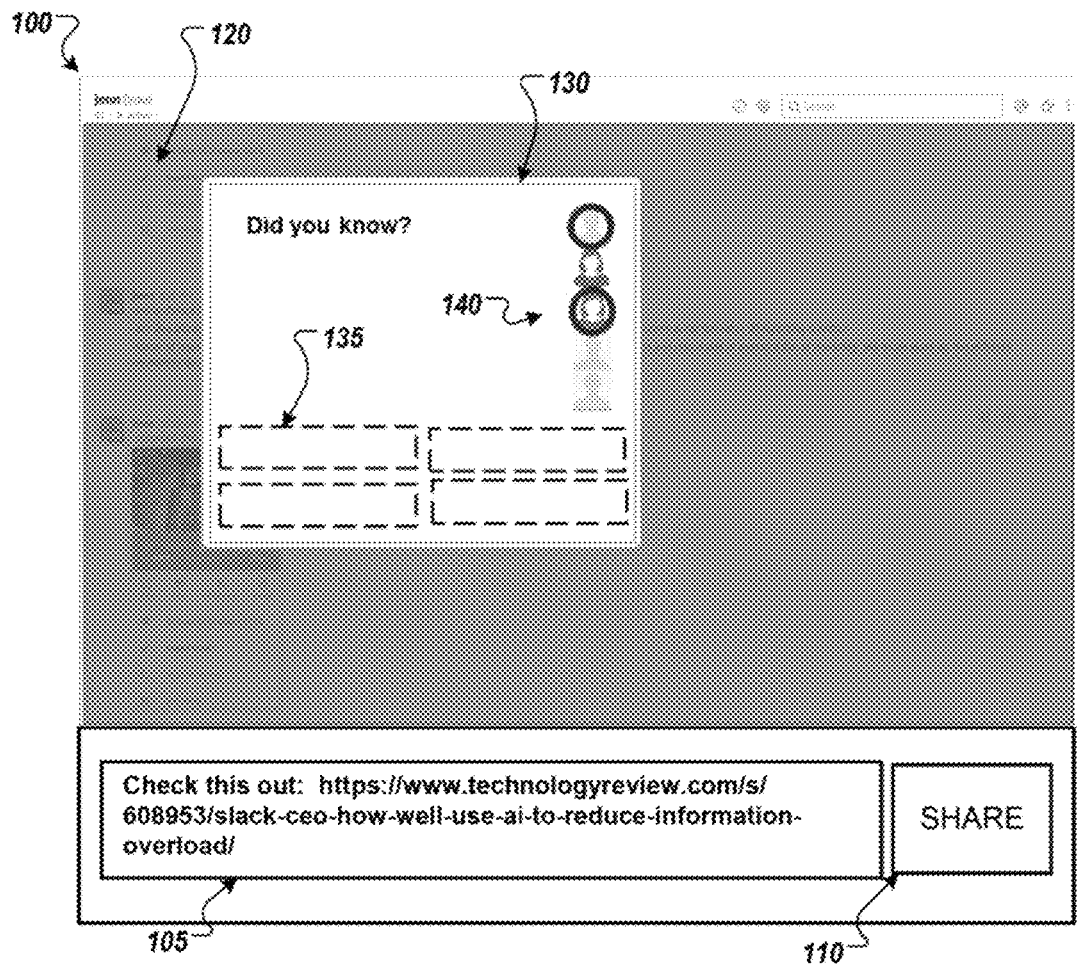
FIG. 1 illustrates an example communication channel interface in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

As described herein, a channel recommendation system uses contextual cues to intelligently detect when duplicate content is being shared in a public and/or semi-public setting such as a workplace communication platform. In an example implementation, the system detects whether an identical or similar piece of content has been shared, how, when, where and with whom, the piece of content was shared. The system analyzes the communication history of the intended group of recipients to present the sender with information and control options for sharing the piece of content. For example, the sender can be presented with adaptive notification interfaces or alert with recommend alternative channels, popularity metrics, versioning information, engagement history, etc.

Accordingly, the system provides users enhanced information before posting information and mitigates information overload to recipients, while at the same time helping to resurface relevant information that may have been forgotten or overlooked.

An example implementation includes detecting a request from a user to add a data item to a communication stream of a channel, analyzing the data item in view of the communication stream to determine a relevancy score for the data item; and providing a control interface for the request based on the relevancy score of the data item. For example, the control interface can include an audience report, a notification, a previous post link, an alternative channel recommendation, a private message invitation, or a proceed to post command.

Users of a communication platform may choose a channel to share information (such as a URL, document, or other content) with a private or public group of users. However, users frequently struggle to find the channel or group where the information was previously shared. Further, information overload or duplicate data items can occur, for example, when two different individuals shared the same website address with two different public channels, where the channels include a number of overlapping members in common (e.g., four people receive the same data item content twice). In another example, multiple users may mention the same problem or concept within a public thread without looking above or seeing what was previously posted.

Aspects of the example implementation are directed to dynamically detecting when a person is about to share information that has already been shared within the communication platform. Example implementation use machine learning to conduct context analysis based on a data item the person is about share and communication history of the potential recipients to intelligently generate control options and/or alerts to the person sharing the information and to the possible recipients of the information. The system learn over time if there are overlaps in shared content between groups that do not directly communicate and use this for input into training behavioral models for a channel recommender engine. An example aspect provides a memory aid to reduce unneeded interruptions via control interfaces integrated or added onto existing communication platforms.

An aspect of the example implementation is described in reference to a workplace communications, such as an office environment. However, the scope of the example implementations is not limited to a specific environment, and other environments may be substituted therefor without departing from the inventive scope. For example, but not by way of limitation, other environments in which the channel recommendation controls can be conducted can include recreational environments other than an office or workplace, such as a community group, therapeutic environments, etc., but are not limited thereto.

FIG. 1 illustrates an example communication channel interface 100 in accordance with an example implementation. A communication platform can include a number of different communication channels for facilitating conversations with different groups or subgroups of users. In some examples, the groups or subgroups of users for different communication channels can dynamically change and have overlapping users at different times. An example communication interface 100 can include a communication stream 120 for a communication channel with a group of users.

In an example, a sender can enter a data item 105 to share or post 110 with the communication channel 120. According to an example implementation, a channel recommendation system can receive the request prior to the data item 105 being published to the communication stream 120 of the communication channel. The channel recommendation system can analyze the data item 105 in view of the communication stream 120 and communication history of the potential recipients of the communication channel and provide a control interface 130 with information 140 and control options 135.

In an example implementation, a user can request to post a website address data item 105, the channel recommendation system can analyze the content of the website, analyze the communication channel or communication history of the group of users, identify previous postings of the website address or similar content across the communication platform. The control interface 130 can provide information 140 about the popularity and engagement history of the website among users of the group and/or platform, alert the user to previous posts of the website data item 105, and/or provide additional control options 135 to share the website data item 105 to a subgroup of the communication channel, in an alternative channel, etc.

Figure 2:
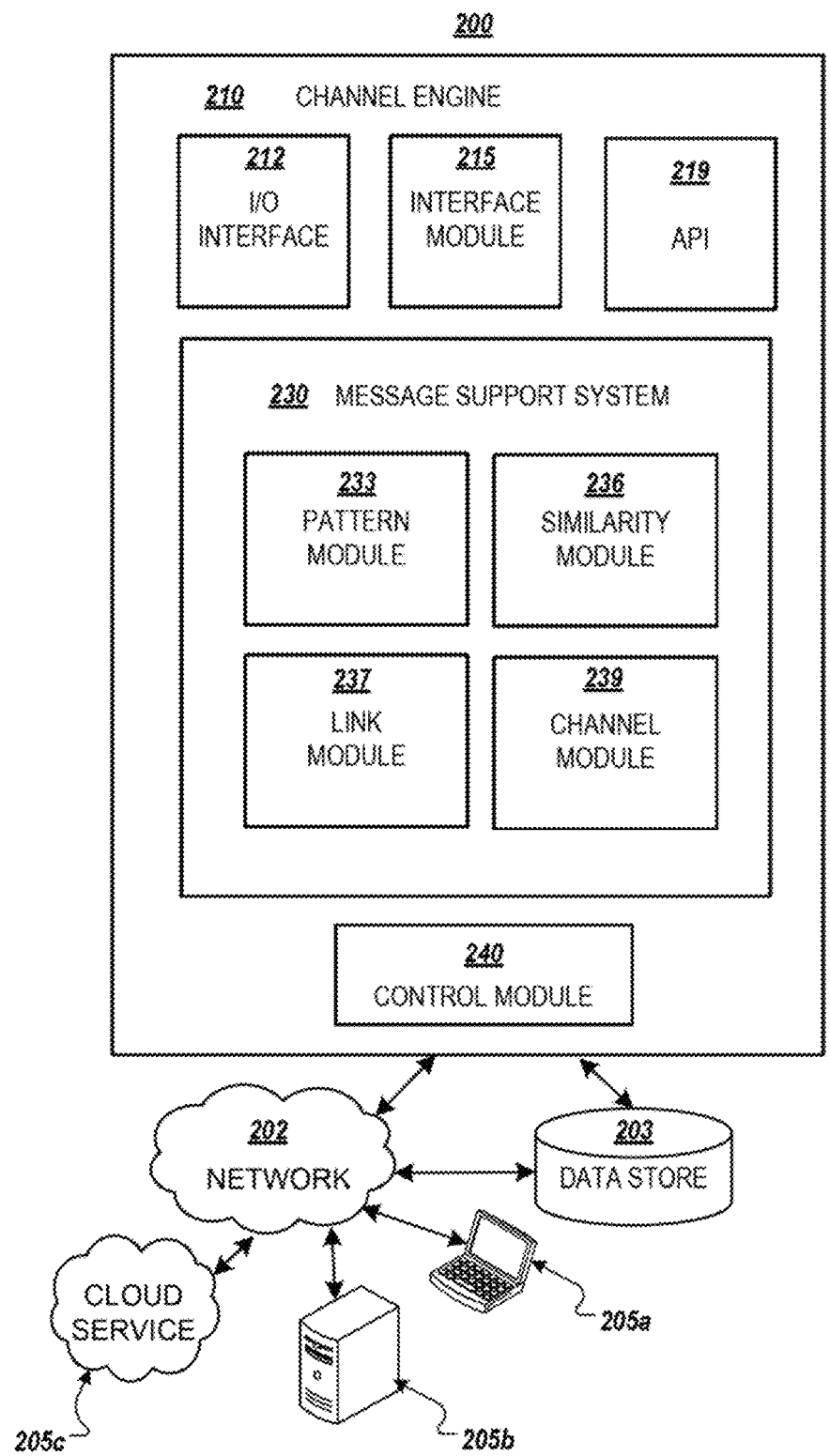
FIG. 2 illustrates an overview of a system in accordance with an example implementation.

FIG. 2 illustrates an overview of a system including a channel engine 210 in accordance with an example implementation.

The channel engine 210 includes one or more I/O interfaces 212, an interface module 215, a message support system 230, and a control module 240. The channel engine 210 is coupled to one or more data stores 203 for storing data (e.g., information, models, data items, document repositories, communication history, meta data, etc.). The channel engine 210 can discern patterns in communication history across a communication platform to detect similar and relevant posts based on context analysis and categorization using topic models. A custom topic model can be developed based on a communication channel, a group of users, or a request to share a data item.

In an example implementation, channel engine 210 can be integrated with or external to a communication platform to facilitate recommending options for sharing data items.

The channel engine 210 can include functionality to monitor multiple communication channels and cataloging posts (e.g., communication history) to enable efficient determinations for processing requests as described in reference to FIGS. 3-6. In an example implementation, the message support system 230 of the channel engine 210 can generate metadata for communication history using machine-learning that inventories each data item.

In an example implementation, the I/O interface 212 includes one or more communication interfaces communicatively connected with a network 202 or different types of devices 205a-c.

The channel engine 210 may be implemented in the form of software (e.g., instructions on a non-transitory computer readable medium) running on one or more processing devices, such as the one or more devices 205a-205b, as a cloud service 205c, remotely via a network 202, or other configuration known to one of ordinary skill in the art.

The terms "computer", "computer platform", processing device, and device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

The channel engine 210 directly or indirectly includes memory such as data store(s) 203 (e.g., RAM, ROM, and/or internal storage, magnetic, optical, solid state storage, and/or organic), any of which can be coupled on a communication mechanism (or bus) for communicating information.

In an example implementation, the channel engine 210 can be hosted by a cloud service 205c and communicatively connected via the network 202 to devices 205a-b in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The I/O interface 212 can receive data from different sources, such as a data store 203, different types of devices 205a-c, the Internet, private data repositories, or via a network 202. Further, the I/O interface 212 can monitor communication channels of an external communication platform and analyze communication history from different sources, such as a data store 203, different types of devices 205a-c, or via a network 202.

Devices 205a-c can include, for example, mobile computing devices 205a (e.g., smart phones, laptops, tablets, etc.), computing devices 205b (e.g., desktops, mainframes, network equipment, etc.), multimedia libraries, cloud services 205c (e.g., remotely available proprietary or public computing resources). Devices 205a-c can access communication services with functionality, for example, to collect, transmit, and/or share data items and message data.

In an example, the data store 203 can store communication history over a period of time (e.g., hours, days, weeks, months, etc.) with metadata including a context, a category, a list of recipients, engagement data, etc. to be used to generate user controls when a duplicate data item is detected. In some example implementations, one or more Application Program Interfaces (APIs) 219 can provide external information (e.g., from document repositories, proprietary databases, external systems, etc.), for example, to compare versions of data items.

The channel engine 210 can interact with data repositories and store communication sessions to output control options. The message support system (MSS) 230 can include a pattern module 233, a similarity module 236, a link module 237, and a channel module 239 that interact with the I/O interface 212, interface module 215, and control module 240. In an example implementation, the message support system 230 includes an analysis process to analyze the context, content, and users associated with data items. The process tracks communication history, determine conversation contexts, learn conversation patterns.

According to an example implementation, the MSS 230 analyzes a communication stream to learn patterns of information sharing and recommend control options for avoiding duplicating shared data items. For example, the MSS 230 can classify a message using lexical pattern and syntactic pattern analysis to train a classification model for learning patterns in group conversations. The pattern module 233 analyzes received data and creates a topic models for use by the channel engine 210. The similarity module 236 determines context factors from the messages using syntax analysis. In an example implementation, the similarity module 236 can include a set of policies to determine whether the information is useful as criteria for classifying messages and scoring relevancy of message with a data item to be shared.

The pattern module 233 and similarity module 236 of MSS 230 develops rules that can include assigning a weighting factor to a channel or posting based on additional parameters through the machine-learning process. According to an example implementation, the similarity module 236 can use the data to recognize context factors to interactively determine or verify that a data item is associated with a relevant context or topic of the channel. In an example implementation, lexical and syntactic question patterns are used to detect features and build classification models. A machine-learning process is implemented to fully automate empirical evaluation of messages based on training data or dynamically updated models as described in further detail in reference to FIGS. 3-6.

The link module 237 identifies correlations between postings in alternative channels, and different groups of users. The link module 237 can interact with the pattern module 233 and the channel module 239 to associate a data item or posting or other messages as described in further detail in reference to FIGS. 3-7.

The channel module 239 can monitor activity associated with the communication platform. In some implementations, the channel module 239 is included in the channel engine 210, may be hosted by a device 205a-205c, and may notify the channel engine 210 of data (e.g., information, requests, data items, etc.). In an example implementation, the channel module 239 tracks the communication behavior of users across different channels and engagement of users with data items. The MSS 230 analyzes the communication history to develop communication models with data item relevancy scoring from the similarity module 236, and can label data items with a category, topic, and/or score.

In an example implementation, the MSS 230 interacts with the control module 240 to actively provide control options for intelligently sharing data items in response to a user proposing to share a duplicate or unrelated data item to one or more recipients. The control module 240 can also provide popularity metrics for a data item, visual graphics, links to previous posts, recommended alternative channels, and/or recipient subgroups based on the analysis by the MSS 230. As the user selects different control options over time, the channel engine 210 can learn the user's sender behavior to adapt control options for future posting requests.

Figure 3:
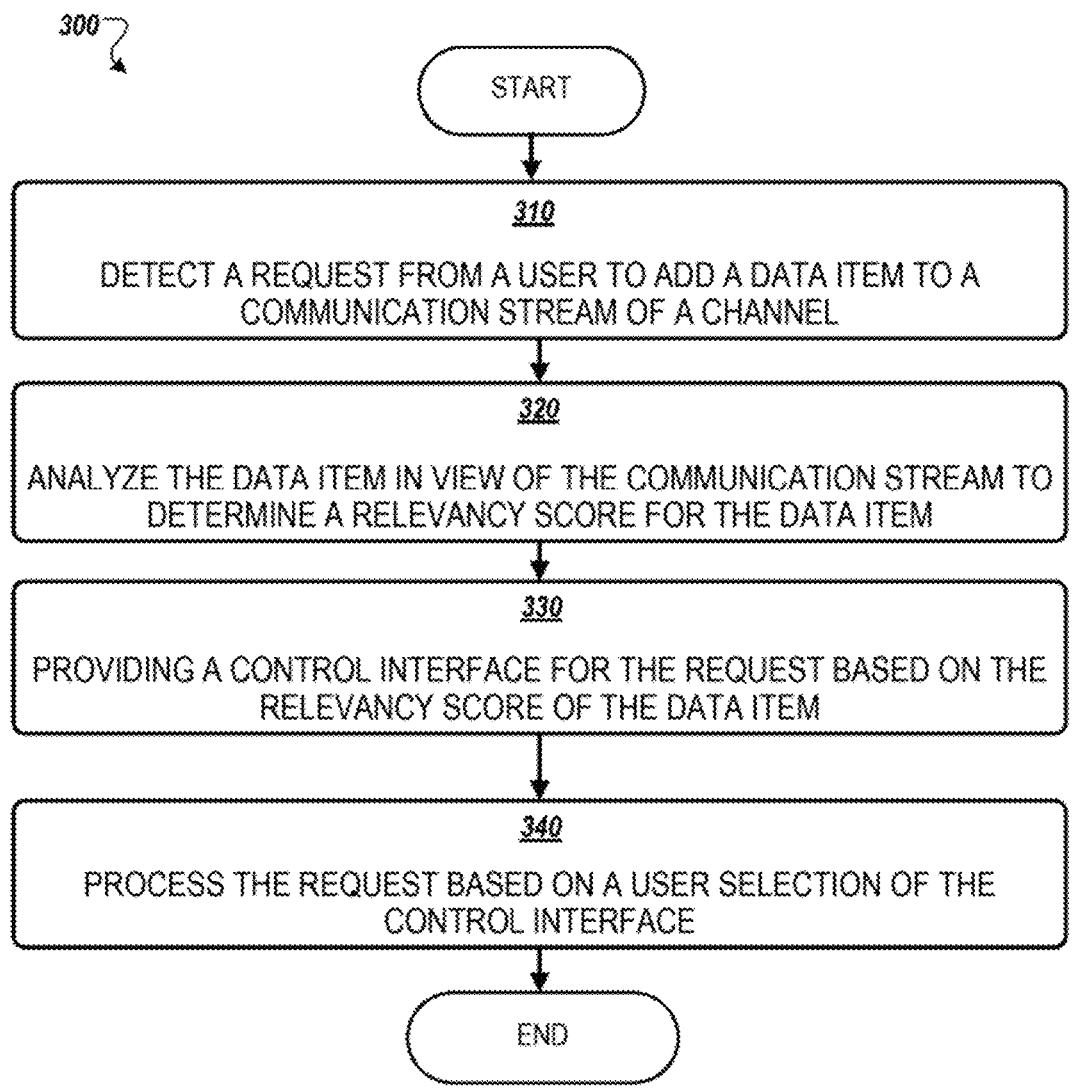
FIG. 3 illustrates an example flow diagram of a context control process in accordance with an example implementation.

FIG. 3 illustrates an example flow diagram of a context control process 300 in accordance with an example implementation. The method 300 can be performed by processing logic that may comprise hardware (circuitry, dedicated logic, etc.), software (such as is run on a general purpose computer system or a dedicated machine), or a combination of both. Method 300 may be performed by a channel engine 210 of FIG. 2. Though method 300 is described as being performed by a processing device and can also be performed by other processing logic.

At 310, the process device detects a request from a user to add a data item to a communication stream of a channel. At 320, the process device analyzes the data item in view of the communication stream to determine a relevancy score for the data item. The relevancy score can be determined by analyzing other posts within a recent time period from the request. In an example implementation, the relevancy score for the data item can be determined based on other content of the communication stream, engagement of other users of the channel, a context of the channel, or similarity with topics other channels.

In an example implementation, the data item can be analyzed in view of the communication channel by identifying other user for the channel, determining one or more alternative channels of the user including at least one of the other users, and determining whether an alternative relevancy based on the one or more alternative channels is greater than the relevancy.

At 330, the process device provides a control interface for the request based on the relevancy score of the data item. For example, the control interface can include a duplication alert in response to the relevancy indicating the data item previously posted in the communication stream. At 340, the user makes a selection from the control interface to process the request.

Figure 4:
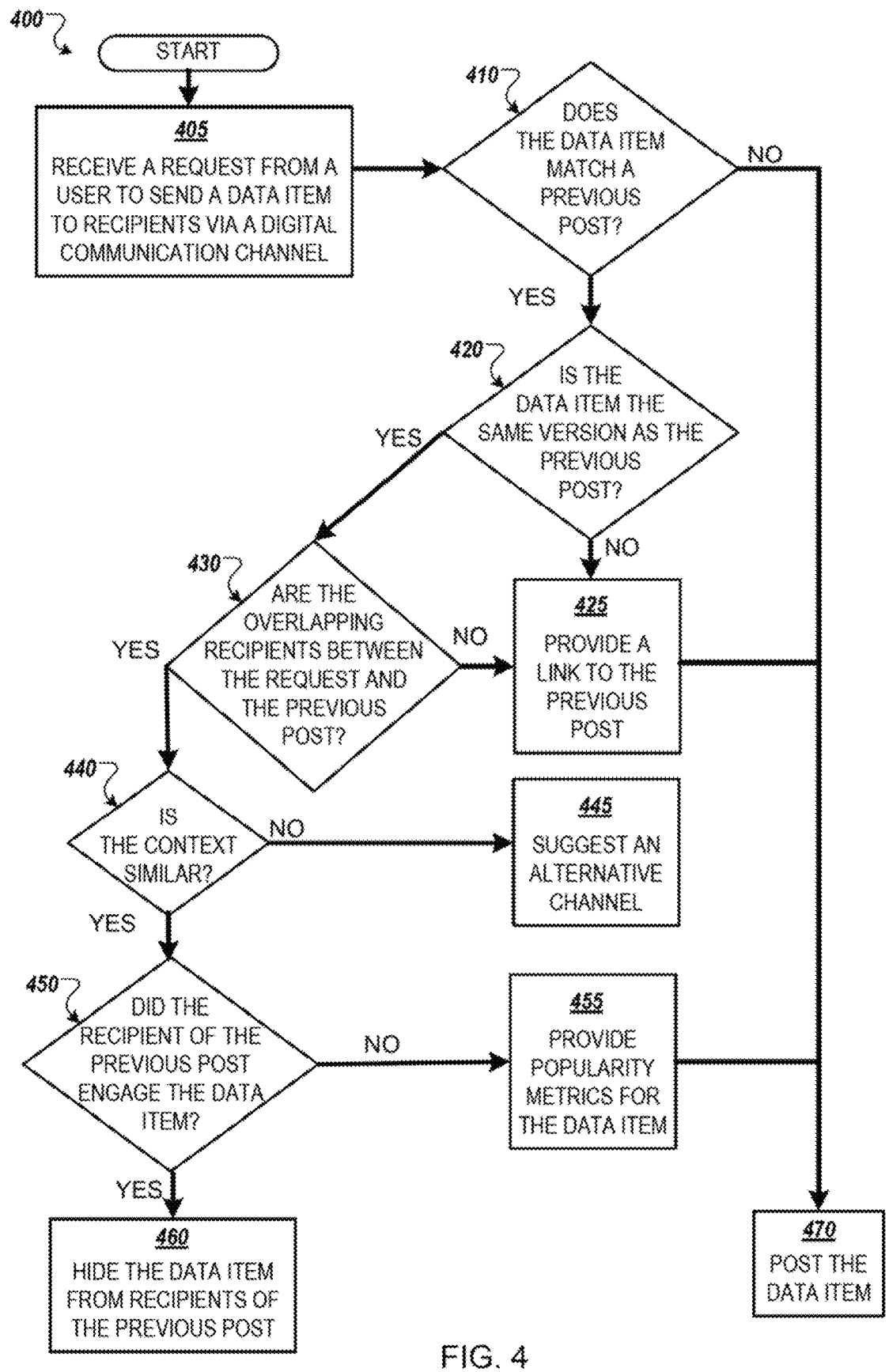
FIG. 4 illustrates an example flow diagram of a context process in accordance with an example implementation.

FIG. 4 illustrates an example flow diagram of a context process 400 in accordance with an example implementation. At 405, a user requests to send a data item to recipients via a digital communication channel. At 410, the data item is checked whether it matches a previous post. If the data item does not match a previous post, then the data item is posted at 470.

If the data item matches a previous post, then at 420 the content of the data item is compared with the content of the previous post to determine whether the content is the same version. If the content is different, the user is provided an option to review the previous post at 425 and/or post the data item at 470.

If the content of the data item is the same version as the previous post, then at 430 the intended recipients of the request are checked against recipients of the previous post to determine whether there are overlapping recipients.

For overlapping recipients, at 440 the context of the data item can be compared with the context of other channels to determine if there are alternative channels with a more suitable context to share the data item at 445.

If the context of the data item is similar to the conversation of the digital communication channel, then at 450 the previous post can be checked to determine whether the recipients engaged the data item.

In some examples, re-posting the data item may be useful if the recipients did not engage the data item in the previous post. The user can receive information (e.g., usage metrics, engagement statistics, etc.) regarding the popularity of the data item to consider at 455.

When the recipients did engage the data item in the previous post, receiving the duplicate data item can be distracting and cause disengagement. Thus at 460, the user can receive an option to hide the data item from those recipients that engaged the previous post. For example, when the audience digital communication channel changes, the user can re-post the data item to new recipients. In an example implementation, the duplicate posting of the data item can be deemphasized (e.g., suppressed, minimized, greyed out, etc.) for recipients of the previous post.

Figure 5:
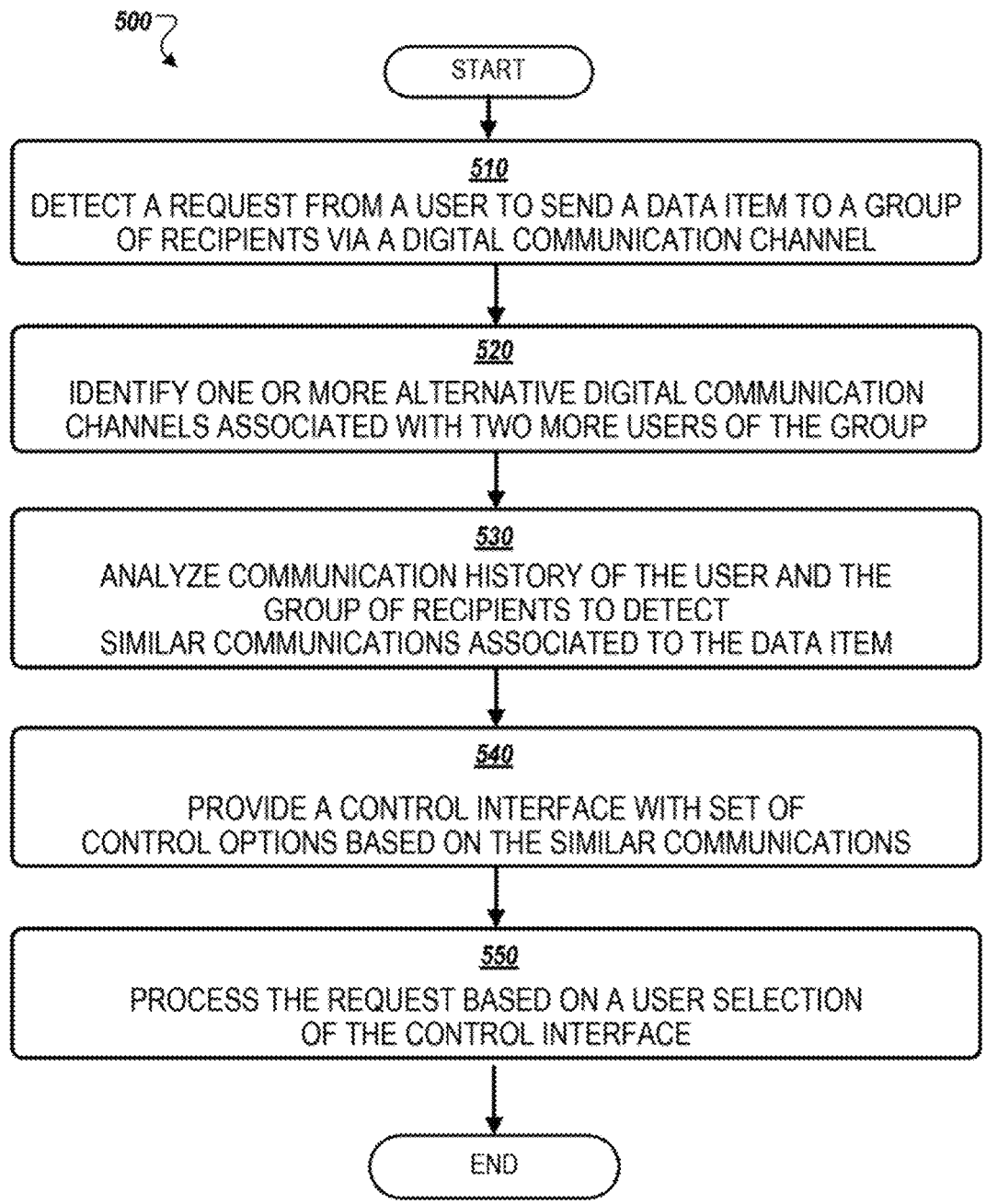
FIG. 5 illustrates an example flow diagram of a channel control process in accordance with an example implementation.

FIG. 5 illustrates an example flow diagram of a channel control process 500 in accordance with an example implementation. At 510, the process detects a request from a user to send a data item to a group of recipients via a digital communication channel. At 520, the process identifies one or more alternative digital communication channels associated with two more users of the group. At 530, the process analyzes the communication history of the user and the group of recipients to detect similar communications associated to the data item. At 540, the process provides a set of controls for the similar communications. For example, the set of controls can include control options to identify the alternative digital communication channels, list a subgroup of recipients for the similar communications, and provide links to the similar communications. At 550, the request is processed according to a user selection of the control options from the control interface.

Figure 6:
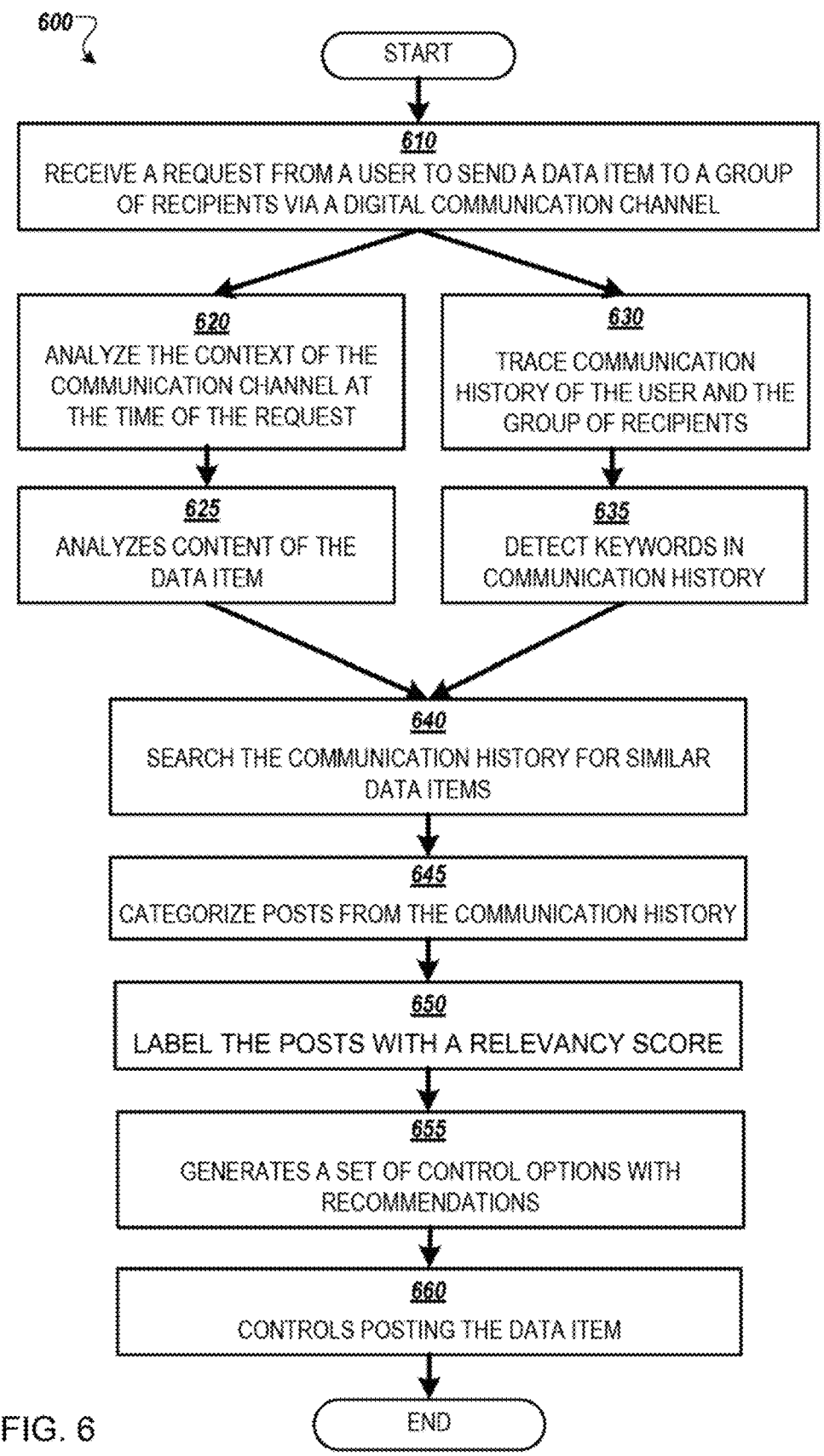
FIG. 6 illustrates an example flow diagram of a channel process in accordance with an example implementation.

FIG. 6 illustrates an example flow diagram of a channel process 600 in accordance with an example implementation. Channel process 600 is an example implementation to determine similar communications associated with a data item using machine learning. The data item from a request and group of intended recipients are analyzed to detect similar communications in different communication channels. The communication channel of the request and the communication history of the group of recipients can be analyzed in parallel or sequentially. In some example implementations, process 600 may be implemented with different, fewer, or more blocks. Process 600 may be implemented as computer executable instructions, which can be stored on a medium, loaded onto one or more processors of one or more computing devices, and executed as a computer-implemented method.

At block 610, the system receives a request from a user to send a data item to a group of recipients via a digital communication channel. At block 620, the system analyzes content of the data item. At block 625, the system analyzes the context of the communication channel at the time of the request. For example, recent posts to the communication channel can be analyzed to identify a common topic being discussed or lack of a common topic. The communication channel may have a theme or topic assigned and can include a channel profile with privacy settings. The system analyzes the posts from the communication history of the group of recipients. The communication history can be processed via the message support system to analyze the content, develop a topic model, and assign categories to the communication history.

At block 630, the system traces the communication history of each user in the current communication channel. A tracking system (e.g., channel module 239 of FIG. 2) can traces the communication history of each user in the current communication channel across a platform with multiple channels. For example, a workplace may have a series of communication channel for different department, topics, etc. The communication history can be limited to a recent time period, for example, the previous week, month, etc. Further, the communication history can be limited to certain types of channels, for example, private channels, public channels, etc. At block 635, the system detects keywords in or around posts to determine context of alternative channels in the communication history.

At block 640, the system searches the communication history for data items similar to the data item of the request. At block 645, the system categorizes the posts of the communication history based on the detected keywords and context. The categorized communication history can be associated with links to similar posts thereby creating a topic trend across channels. The topics and/or categories associated with the analyzed recent communication history can be used by the message support system. For example, a topic and/or category of the data item can be detected to identify one or more alternative digital communication channels with common users that have posts or data items with a similar topic and/or category. The messaging support system can use the topic and/or category of the data item as weighted input for pattern detection and categorization of the audience's communication history.

According to another example implementation, posts that include a data item similar the request can be used to generate popularity metrics with links to the previous posts and/or alternative channels. For example, feature vectors and syntactic pattern analysis can be employed. Examples of pattern analysis can include identification of repeated keywords from different data items, access detection of remote content sources, rate of conversation after a post, etc. A mining and leaning process can be fully automated that requires no human intervention to provide empirical evaluation of communication history based on training data or dynamically updated models. Other methods for detecting the topic of a communication history can be based on generic natural language processing.

Additional categories, specific to a communication channel, can be incrementally generated, e.g., using the topic model. For example, latent Dirichlet allocation can be used to generate statistical model for sets of observations to be explained by unobserved groups to associate parts of the data that are similar. Inference learning (e.g., Bayesian inference, Gibbs sampling, and expectation propagation) can be used to determine the distributions of a set of topics, associated word probabilities, the topic of each word, a particular topic mixture of posts or channels, etc. The analysis can be used to provide popularity metrics associated with the data item, a channel, a topic, etc.

Context relevant terms (e.g., important or unique words) can be detected and included in the pattern analysis. For example, a workplace conversation may be dominated by acronyms, industry specific, or organization specific terms. According to an example implementation, unique terms can be flagged relative to a channel or group of users that frequently collaborate across channels. For example, the process can include term frequency—inverse document frequency vector space modeling and advanced key phrase detection methods based on natural language processing (NLP). Relevance rankings of keywords in the posts or alternative channels can be calculated.

At block 650, the system labels the posts with a relevancy score. In an example implementation, the system analyzes each post to score the relevancy of posts in the communication history. For example, the engine can determine a relevancy score based on a potential match to the data item of the request, a similar source as the data item of the request, a similar topic as the data item of the request, amount of engagement associated with a previous data item, overlapping recipients, etc.

At block 655, the system generates a set of control options to recommend to the user that submitted the request. At block 660, the system controls posting the data item to the requested channel, a suggested alternative channel, a subgroup, etc.

Figure 7A:
FIGS. 7A and 7B illustrate example control interfaces in accordance with an example implementation.
Figure 7A:
Figure 7A:
Figure 7A:
Figure 7A:
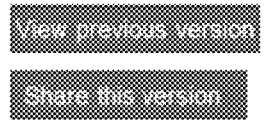
Figure 7B:
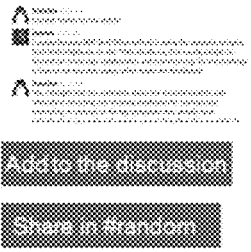
Figure 7B:
Figure 7B:
Figure 7B:

FIGS. 7A and 7B illustrate example control interfaces in accordance with an example implementation. Example the control interfaces can include various combinations of options control options for example an audience report, a notification, a previous post link, an alternative channel recommendation, a private message invitation, and/or a proceed to post command.

In example chat-based collaboration platforms (e.g., group chats, Hangout™, Slack™, etc.), information may be shared at various levels of granularity. For example, different channels may be public channels open to all employees (e.g. #general), on public channels with a subset of employees who are members (e.g. #enterprisecomm), in sets of direct (private) messages with small groups, and in direct one-on-one private messages with a single person.

Interface 700 can provide the user with information regarding previous posts of the data item (e.g., the channel), display a recent post with the data item, and control options to review previous posts or share the data item. Interface 710 can notify the user the data item was recently shared in another channel, indicate the overlapping recipients, and control options to re-post the data item. Interface 720 can notify the user a different version of the data item was recently shared, differences between the versions, and control options to review the previous version or post the data item.

Interface 730 can alert the user to other alternative channels with the data item, provide a preview of other posts that include the data item, and provide control options to post the data item in the alternative channels. Interface 740 can alert the user to other alternative channels with a relevant context to the data item and provide control options to review the alternative channels and post the data item. Interface 750 can notify the user regarding the popularity of the data item or the topic of the data item (e.g., graphs, metrics, etc.), indicate other users engaging the data item, and/or suggest alternative channels to share the data item.

Figure 8:
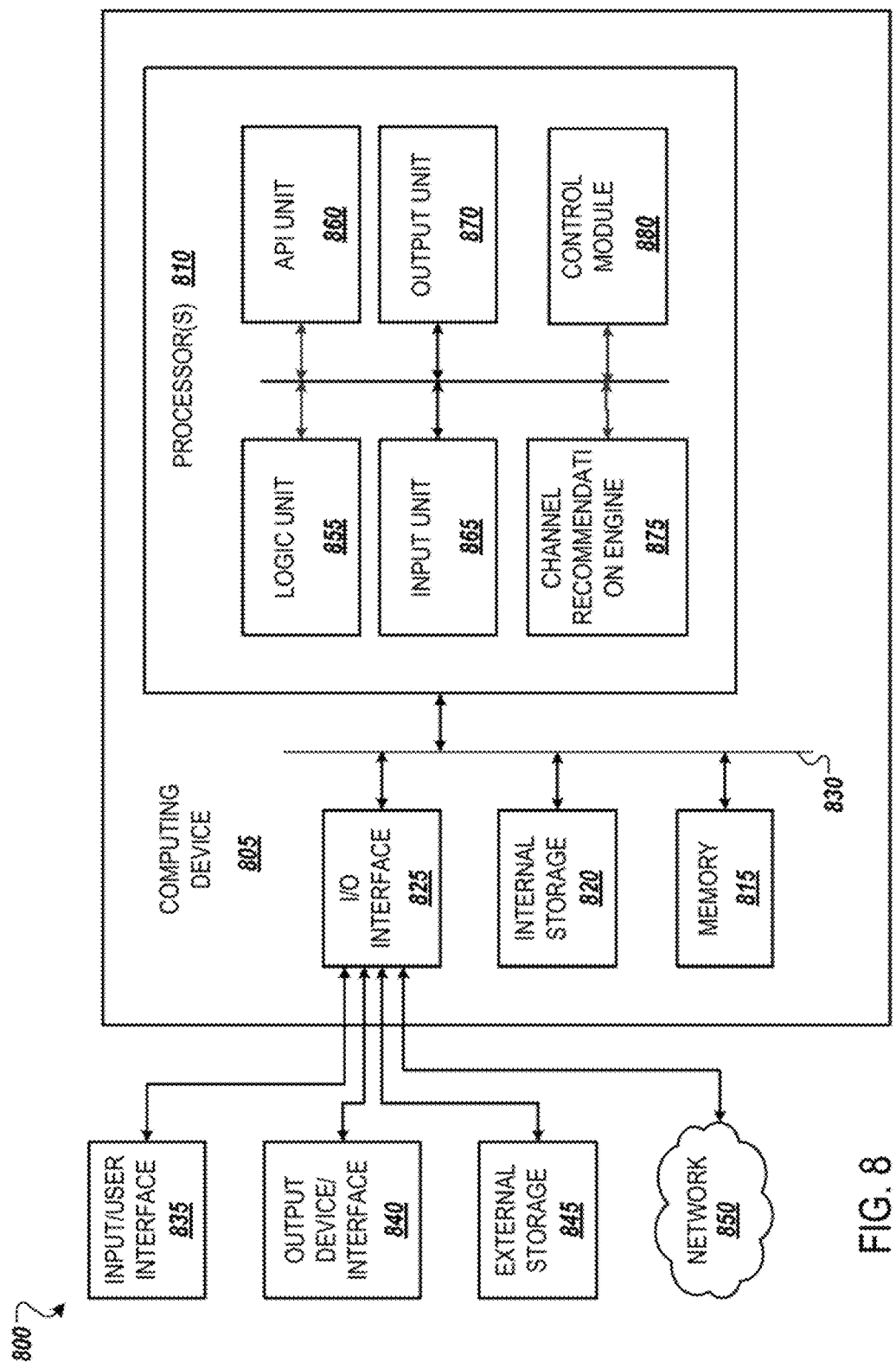
FIG. 8 illustrates an example server computing environment with an example computer device suitable for use in example implementations.

FIG. 8 shows an example computing environment with an example computing device associated with the external host for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

The I/O interface 825 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, channel recommendation engine 875 and control module 880.

For example, input unit 865, channel recommendation engine 875 and control module 880 may implement one or more processes shown in FIGS. 2, 4-5 and 8. The described units and elements can be varied in design, function, configuration, or implementation and are not limited to the descriptions provided.

In some example implementations, when information or an execution instruction is received by API unit 860, it may be communicated to one or more other units (e.g., logic unit 855, output unit 870, input unit 580, input unit 865, channel recommendation engine 875 and control module 880).

Input unit 865 may, via API unit 860, interact with the channel recommendation engine 875 and control module 880 to provide the control options associated with a request to post a data item. In some instances, logic unit 855 may be configured to control the information flow among the units and direct the services provided by API unit 860, input unit 865, output unit 870, input unit 865, channel recommendation engine 875 and control module 880 in some example implementations described above. For example, the flow of one or more processes or implementations may be controlled by logic unit 855 alone or in conjunction with API unit 860.

Figure 9:
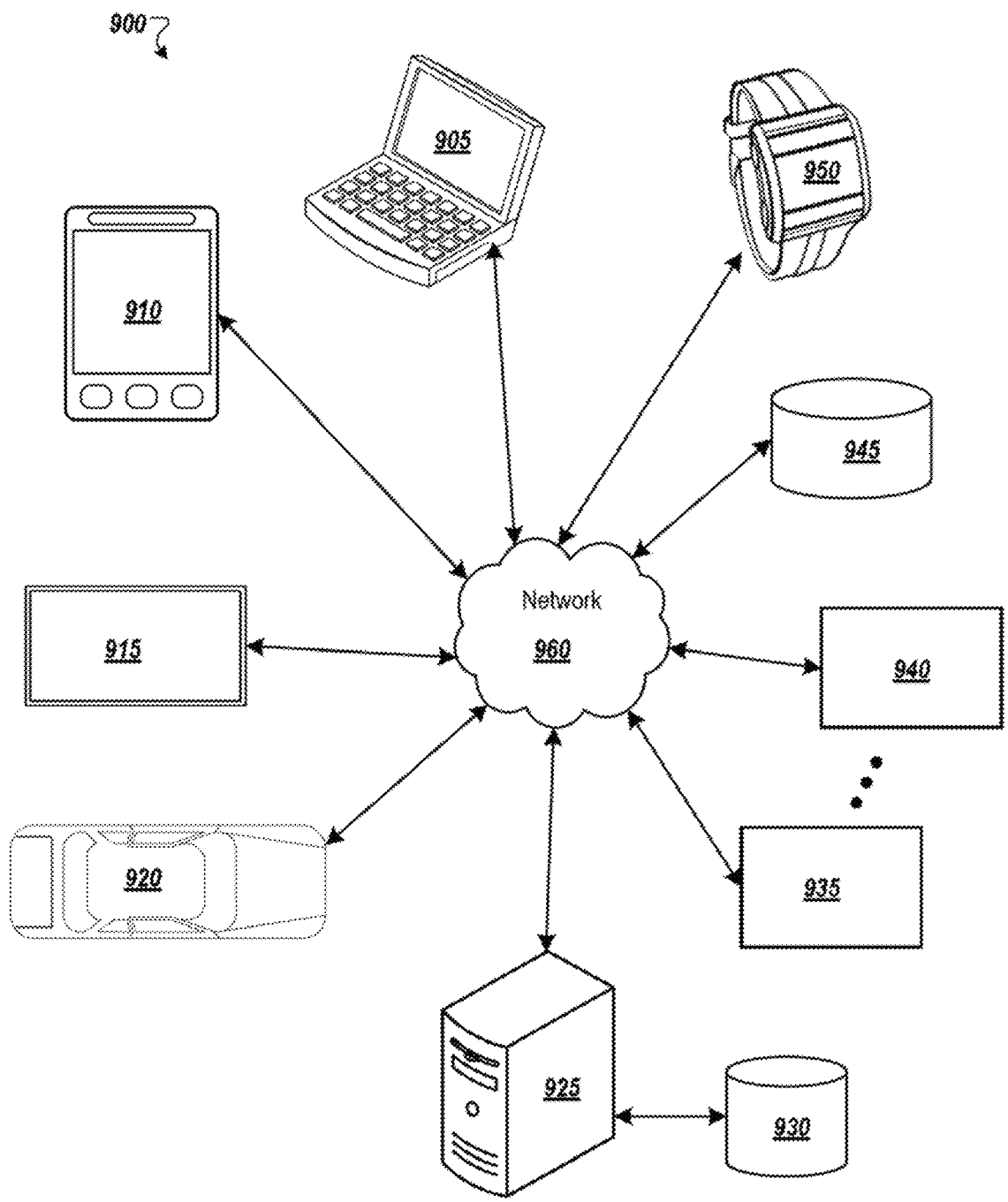
FIG. 9 illustrates an example networking environment with example computer devices suitable for use in example implementations.

FIG. 9 shows an example environment suitable for some example implementations. Environment 900 includes devices 905-950, and each is communicatively connected to at least one other device via, for example, network 960 (e.g., by wired and/or wireless connections). Some devices may be communicatively connected to one or more storage devices 930 and 945.

An example of one or more devices 905-950 may be computing devices 805 described in regards to FIG. 8, respectively. Devices 905-950 may include, but are not limited to, a computer 905 (e.g., a laptop computing device) having a display and as associated webcam as explained above, a mobile device 910 (e.g., smartphone or tablet), a television 915, a device associated with a vehicle 920, a server computer 925, computing devices 935-940, storage devices 930 and 945. As explained above, the meeting environment of the user may vary, and is not limited to an office environment.

In some implementations, devices 905-920, 950 may be considered user devices associated with the users of the enterprise. Devices 925-950 may be devices associated with client service (e.g., used by the users or administrators to provide services as described above and with respect to FIGS. 1-6 and/or information thereabout).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "determining," "analyzing," "providing," "identifying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system comprising:
a memory;
a processor operatively coupled to the memory, the processor configured to:
  detect a request from a user to send a data item to a group of recipients via a digital communication channel;
  identify one or more alternative digital communication channels associated with each of the recipients of the group;
  analyze communication history of the user and the recipients to detect duplicative communications, corresponding to the data item, from the one or more alternative digital communication channels, analyzing the communication history to detect duplicative communications comprises:
    determine a context of the digital communication channel at a time that the request is detected;
    for each recipient, trace the communication history of the one or more alternative communication channels;
    detecting keywords in communications from each one or more alternative communication channels proximate to and around the communications from each one or more alternative communication channels;
    determine a context of each of the one or more alternative communication channels, wherein the context of each of the one or more alternative communication channels is based on the detected keywords;
    search the one or more alternative communication channels for duplicative communications that correspond to the data item based on content of the data item;
    categorize the duplicative communications using a machine learning based on the context of the digital communication channel and the context of the one or more alternative communications;
  analyze the detected duplicative communications in view of the data item and the one or more alternative digital communications to determine a relevancy score for each of the detected duplicative communications to the data item;
  suggest at least one alternative digital communication channel of the one or more alternative digital communication channels based on the relevancy score; and
  provide a set of controls for the duplicative communications, wherein the controls comprise at least suggesting one or more links to the duplicative communications from the one or more alternative digital communication channels,
wherein the machine learning is configured to learn, over time, overlaps between (i) contents shared between the recipients of the group and (ii) contents shared between recipients of another group that do not exchange communications with the group of recipients, and provide the overlaps as input into training behavior models for detecting the duplicative communications, and
wherein the controls comprise:
  providing a link to one of the duplicative communications from the one or more alternative digital communication channels responsive to the processor determining the one of the duplicative communications is not a same version as the data item;
  if the one of the duplicative communications is the same version as the data item, providing the link to one of the duplicative communications from the one or more alternative digital communication channels responsive to the processor determining there are no overlapping recipients between the group of the recipients for the request and recipients of the one of the duplicative communications;
  if there are overlapping recipients, suggesting at least one alternative digital communication channel of the one or more alternative digital communication channels that includes the one of the duplicative communications responsive to the context of the at least one alternative digital communication channel not being the same as the context of the digital communication channel;

if the context is the same, providing a popularity metric of the one of the duplicative communications responsive to the processor determining that overlapping recipients did not engage with the one of the duplicative communications; and if an overlapping recipient did engage with the one of the duplicative communications, hiding the data item from the overlapping recipient that engaged with the one of the duplicative communications.

2. The system of claim 1, wherein the controls comprise at least one of identify the one or more alternative digital communication channels and provide a list of a subgroup of recipients for the duplicative communications.

3. The system of claim 1, wherein to analyze the communication history comprises at least one of context analysis, content analysis, and user analysis.

4. The system of claim 1, wherein the relevancy score for each of the one or more alternative digital communication channels is based on an overlap of recipients between each respective alternative digital communication channel and the digital communication channel.

5. The system of claim 1, wherein the controls comprises at least one of a notification that the duplicative communications included a different version of the data item and display differences between the data item and the different version of the data item.

6. The system of claim 1, wherein the controls comprises providing the user with information regarding the duplicative communications and display a portion of the duplicative communications.

7. The system of claim 1, wherein the controls comprises an indication to the user of recipients of the group of recipients that overlap with recipients of the duplicative communications.

8. The system of claim 1, wherein suggesting at least one alternative digital communication channel comprises:
determine an alternative relevancy of the data item to the at least one alternative communication channel; and
suggest the at least one alternative communication channel in response to the alternative relevancy being higher than the relevancy of the data item to the digital communication channel.

9. A non-transitory computer readable medium, comprising instructions that when executed by a processor, the instructions to:
detect a request from a user to send a data item to a group of recipients via a digital communication channel;
identify one or more alternative digital communication channels associated with each of the recipients of the group;
analyze communication history of the user and the recipients to detect duplicative communications, corresponding to the data item, from the one or more alternative digital communication channels, analyzing the communication history to detect duplicative communications comprises:
determine a context of the digital communication channel at a time that the request is detected;
for each recipient, trace the communication history of the one or more alternative communication channels;
detecting keywords in communications from each one or more alternative communication channels proximate to and around the communications from each one or more alternative communication channels;
determine a context of each of the one or more alternative communication channels, wherein the context of each of the one or more alternative communication channels is based on the detected keywords;
search the one or more alternative communication channels for duplicative communications that correspond to the data item based on content of the data item;
categorize the duplicative communications using a machine learning based on the context of the digital communication channel and the context of the one or more alternative communications;
analyze the detected duplicative communications in view of the data item and the one or more alternative digital communications to determine a relevancy score for each of the detected duplicative communications to the data item;
suggest at least one alternative digital communication channel of the one or more alternative digital communication channels based on the relevancy score; and
provide a set of controls for the duplicative communications, wherein the controls comprise at least suggesting one or more links to the duplicative communications from the one or more alternative digital communication channels,
wherein the machine learning is configured to learn, over time, overlaps between (i) contents shared between the recipients of the group and (ii) contents shared between recipients of another group that do not exchange communications with the group of recipients, and provide the overlaps as input into training behavior models for detecting the duplicative communications, and
wherein the controls comprise:
providing a link to one of the duplicative communications from the one or more alternative digital communication channels responsive to the processor determining the one of the duplicative communications is not a same version as the data item;
if the one of the duplicative communications is the same version as the data item, providing the link to one of the duplicative communications from the one or more alternative digital communication channels responsive to the processor determining there are no overlapping recipients between the group of the recipients for the request and recipients of the one of the duplicative communications;
if there are overlapping recipients, suggesting at least one alternative digital communication channel of the one or more alternative digital communication channels that includes the one of the duplicative communications responsive to the context of the at least one alternative digital communication channel not being the same as the context of the digital communication channel;
if the context is the same, providing a popularity metric of the one of the duplicative communications responsive to the processor determining that overlapping recipients did not engage with the one of the duplicative communications; and
if an overlapping recipient did engage with the one of the duplicative communications, hiding the data item from the overlapping recipient that engaged with the one of the duplicative communications.

10. The non-transitory computer readable medium of claim 9, wherein the controls comprise at least one of identify the one or more alternative digital communication channels and provide a list of a subgroup of recipients for the duplicative communications.

11. The non-transitory computer readable medium of claim 9, wherein to analyze the communication history comprises at least one of context analysis, content analysis, and user analysis.

\* \* \* \* \*